(12) United States Patent
Gasbarro

(10) Patent No.: US 11,807,472 B2
(45) Date of Patent: Nov. 7, 2023

(54) PRODUCT TRANSFER ROLLER

(71) Applicant: Prime Equipment Group, LLC, Columbus, OH (US)

(72) Inventor: Geno N. Gasbarro, Columbus, OH (US)

(73) Assignee: Prime Equipment Group, LLC, Columbus, OH (US)

( * ) Notice: Subject to any disclaimer, the term of this patent is extended or adjusted under 35 U.S.C. 154(b) by 544 days.

(21) Appl. No.: 17/099,084

(22) Filed: Nov. 16, 2020

(65) Prior Publication Data

US 2022/0153534 A1    May 19, 2022

(51) Int. Cl.
*B65G 47/82*    (2006.01)
*A22C 21/00*    (2006.01)
(Continued)

(52) U.S. Cl.
CPC .......... *B65G 47/82* (2013.01); *A22C 21/0092* (2013.01); *B65G 15/58* (2013.01);
(Continued)

(58) Field of Classification Search
CPC . A22C 21/0053; A22C 21/0092; A22B 5/166; B65G 47/82; B65G 15/58;
(Continued)

(56) References Cited

U.S. PATENT DOCUMENTS 4,670,943 A    6/1987 Townsend
9,999,234 B1 *    6/2018 Diab .................. A22C 21/0053
(Continued)

FOREIGN PATENT DOCUMENTS

CN    103803279 A    5/2014
DE    195 11 672 A1    10/1998
(Continued)

OTHER PUBLICATIONS

Communication (Extended European Search Report) dated Jun. 17, 2022, issued in European Patent Application No. 21 206 858.9-1105, filed Nov. 16, 2020, 8 pages.

*Primary Examiner* — Richard T Price, Jr.
(74) *Attorney, Agent, or Firm* — CHRISTENSEN O'CONNOR JOHNSON KINDNESS PLLC

(57) ABSTRACT

An apparatus 10 for removing the skin of poultry pieces at a skinning station 12 includes an infeed conveyor 14 for transporting or feeding poultry pieces to the skinning station 12. The infeed conveyor 14 includes an endless belt 16 that is trained around an end roller 18 at the downstream end of the infeed conveyor. A pinch block 20 is configured with a concave pinch surface 22 having curvature closely following the curvature of the endless belt 16 trained around the end roller 18 to define a narrow gap 24 therebetween for capturing the skin of the poultry piece and forcing the skin through the gap 24, thereby pulling the skin away from the underlying flesh of the poultry piece. A transfer roller 26 assists in transferring the skinned poultry piece to an outfeed conveyor 28. A hold down structure 30 is provided for applying downward pressure on the poultry piece as the poultry piece is carried by the infeed conveyor 14 towards the skinning station 12, while the poultry skin is being removed, and also while the skinned poultry piece is being transferred to the outfeed conveyor 28.

20 Claims, 7 Drawing Sheets

(51) Int. Cl.
*B65G 15/58* (2006.01)
*B65G 39/02* (2006.01)
*B65G 37/00* (2006.01)

(52) U.S. Cl.
CPC ............ *B65G 37/00* (2013.01); *B65G 39/02* (2013.01); *B65G 2201/0202* (2013.01)

(58) Field of Classification Search
CPC  B65G 37/00; B65G 2201/0202; B65G 23/44; B65G 13/66
USPC ........................................................ 452/125
See application file for complete search history.

(56) References Cited

U.S. PATENT DOCUMENTS

| | | | |
|---|---|---|---|
| 10,617,126 B2 | 4/2020 | Gasbarro | |
| 2013/0157553 A1* | 6/2013 | Haines ................ | A22C 21/0092 452/125 |
| 2019/0327984 A1* | 10/2019 | Gasbarro ........... | A22C 21/0053 |

FOREIGN PATENT DOCUMENTS

| | | |
|---|---|---|
| WO | 2009021672 A1 | 2/2009 |
| WO | 2009100912 A1 | 8/2009 |
| WO | 2018157988 A1 | 9/2018 |

* cited by examiner

PRODUCT TRANSFER ROLLER

BACKGROUND

The skin of poultry pieces is often removed prior to retail sales due to consumer demands. Automated devices have been developed for removing the skin from poultry pieces without the need to perform this task manually. However, in prior devices, often a significant amount of flesh is also removed from the poultry piece together with the skin. Further, this may not always be properly gripped by the device, and so either the skin may be ripped or torn or the skin may not be removed in whole or in part from the poultry piece. The present disclosure seeks to provide a poultry skinning apparatus that addresses the foregoing shortcomings.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a poultry product skinning apparatus includes an infeed conveyor for transporting poultry pieces toward a skinning station, the infeed conveyor having a textured endless conveyor belt for gripping the skin of the poultry piece, and the infeed conveyor having a downstream end at the skinning station where the conveyor belt travels along an arcuate path, a powered outfeed conveyor for transporting skinned poultry pieces away from the skinning station, and a pinch block isolated at the skinning station. The pinch block has an arcuate surface in close proximity to the arcuate path of the infeed conveyor belt to define an opening sized to engage the outer skin of the poultry piece between the infeed conveyor belt and the arcuate surface of the pinch block to pull the skin from the poultry piece. A powered transfer roller is positioned between the downstream end of the infeed conveyor and the upstream end of the outfeed conveyor to support and facilitate transfer of the skinned poultry piece from the infeed conveyor to the outfeed conveyor. A hold-down structure is spaced above the skinning station. The hold-down structure is mounted to apply downward pressure to the poultry piece while at the skinning station.

In any of the embodiments described herein, the transfer roller is configured to grip the underside of the skinned poultry piece.

In any of the embodiments described herein, the exterior configuration of the transfer roller is selected from one of the group of: projections, ribs, ridges, flutes, teeth, and knurling.

In any of the embodiments described herein, the transfer roller extends laterally to the lengths of the infeed conveyor and outfeed conveyor.

In any of the embodiments described herein, the transfer roller is positioned so that the upper surface of the transfer roller is at an elevation corresponding to the top surface of the infeed conveyor.

In any of the embodiments described herein, the transfer roller is positioned so that the upper surface of the transfer roller corresponds to the elevation of the top surface of the outfeed conveyor.

In any of the embodiments described herein, the surface speed of the transfer roller corresponds to the speed of at least one of the infeed conveyor and the outfeed conveyor.

In any of the embodiments described herein, the downstream end of the infeed conveyor is defined by an end roller around which the infeed conveyor belt is trained; and the diameter of the transfer roller is from $1/6^{th}$ to $1/3^{rd}$ of the diameter of the end roller of the infeed conveyor.

In any of the embodiments described herein, the hold down structure extends across the infeed belt.

In any of the embodiments described herein, the hold down structure is spaced above the infeed belt and the transfer roller.

In any of the embodiments described herein, the hold down structure applies a downward load on the poultry pieces of about 2 to 6 pounds.

In any of the embodiments described herein, wherein the hold down structure comprises an upstream end section and a downstream end section, and the apparatus further comprises a pivot mounting structure to pivotally mount the up-stream end of the hold down structure to allow the downstream end section of the for the hold down structure to press against the poultry piece being skinned.

In any of the embodiments described herein, further comprising at least one of a first stop to limit the downward travel of the downstream end portion of the hold down structure, and a second stop to limit the upward travel of the downstream end portion of the hold down structure.

In any of the embodiments described herein, wherein the hold down structure comprises a plate extending across substantially the width of the infeed conveyor, the downstream section of the plate extending downstream along the infeed conveyor to at least the location of the transfer roller.

In any of the embodiments described herein, wherein the plate defines an underside facing the infeed conveyor, the underside of the plate being polished to a finish of at least 1.5 to 0.9 micrometers In any of the embodiments described herein, wherein the hold down structure comprises a plurality of rods extending long the length of the infeed conveyor and spaced across the width of the infeed conveyor.

In any of the embodiments described herein, wherein the rods have an upstream end that is pivotally mounter to enable each rod to pivot in independently of each other.

In any of the embodiments described herein, wherein the texture of the input conveyor belt comprises protrusions extending from the conveyor belt.

In any of the embodiments described herein, wherein the shape of the protrusions is selected from the group including circular, square, rectangular, triangular, arcuate, elliptical, and oval.

In any of the embodiments described herein, wherein the protrusions comprise ribs extending across the width of the input conveyor belt.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

Figure 1:
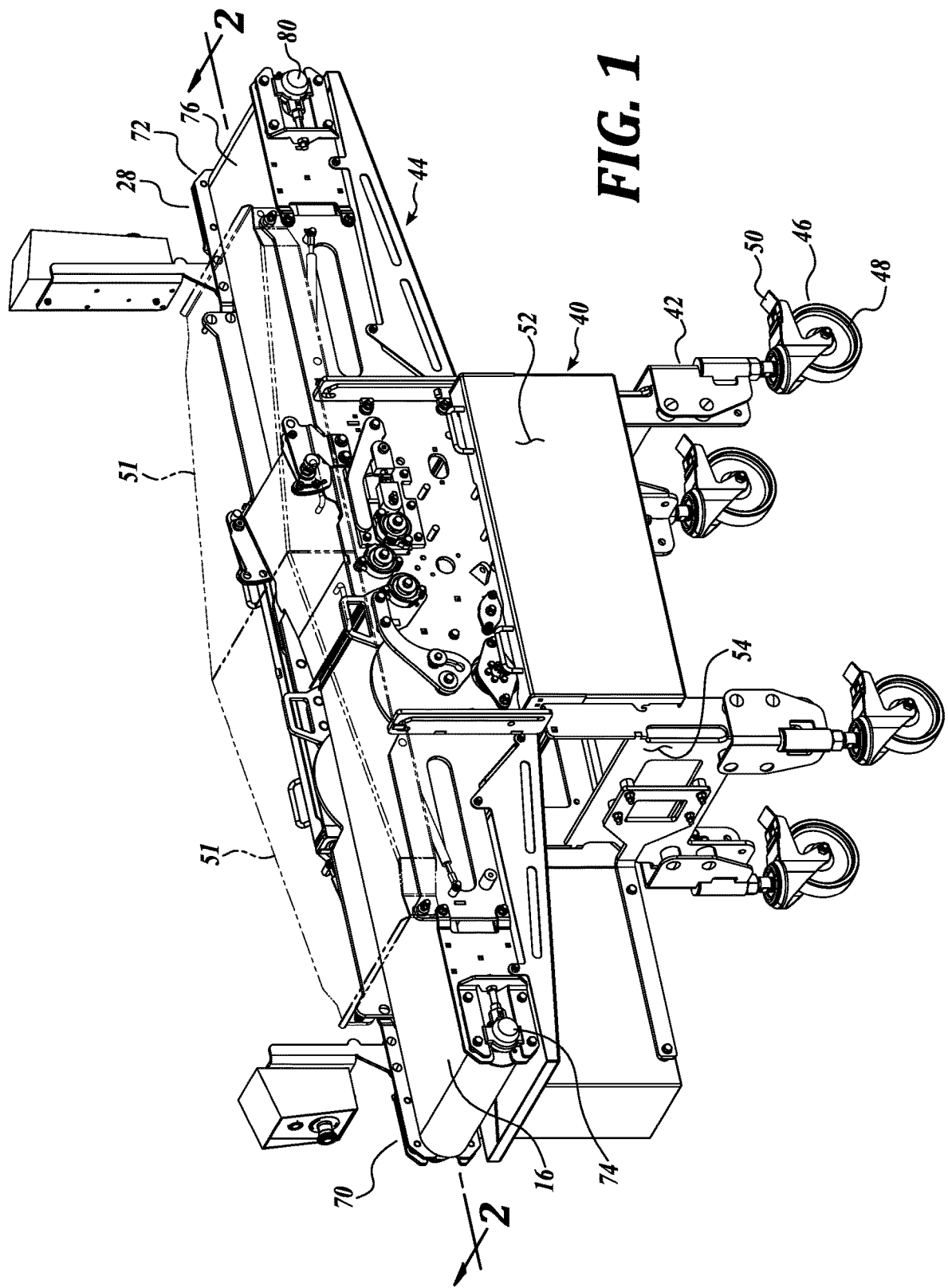
FIG. 1 is a pictorial view of an embodiment of the present disclosure with parts removed to enable the interior of the poultry skinning device to be viewed.
Figure 2:
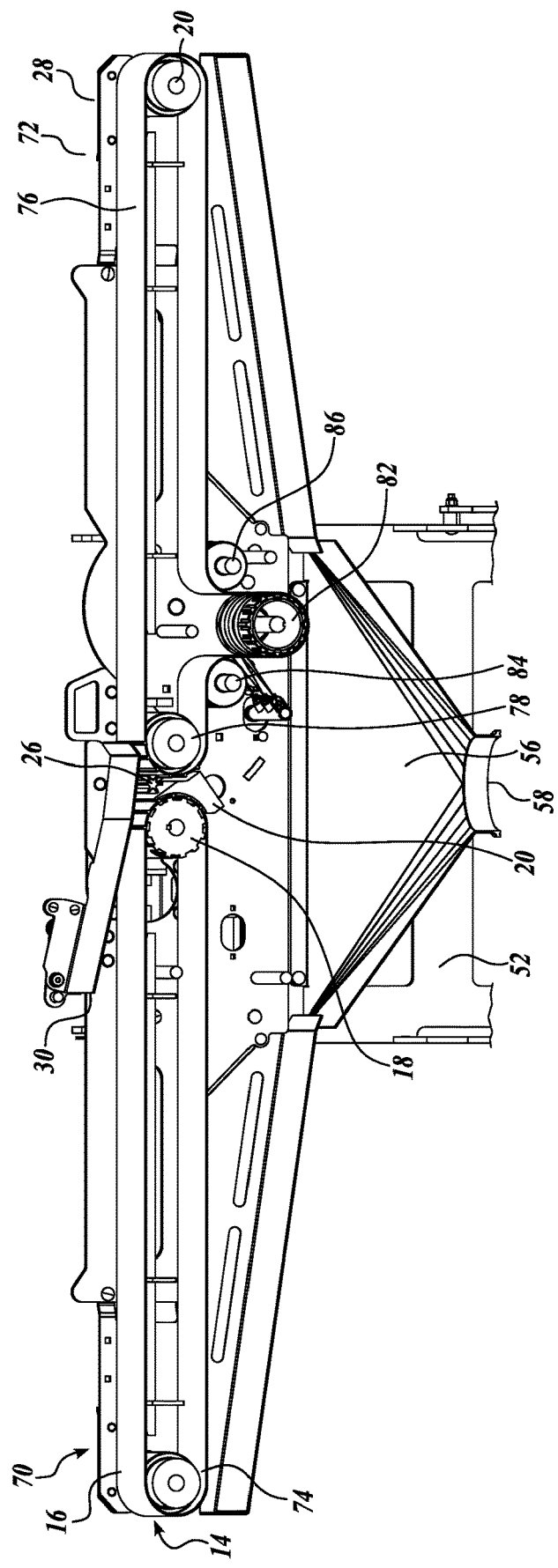
FIG. 2 is a perspective cross-sectional view of FIG. 1, taken along lines 2-2 thereof.
Figure 3:
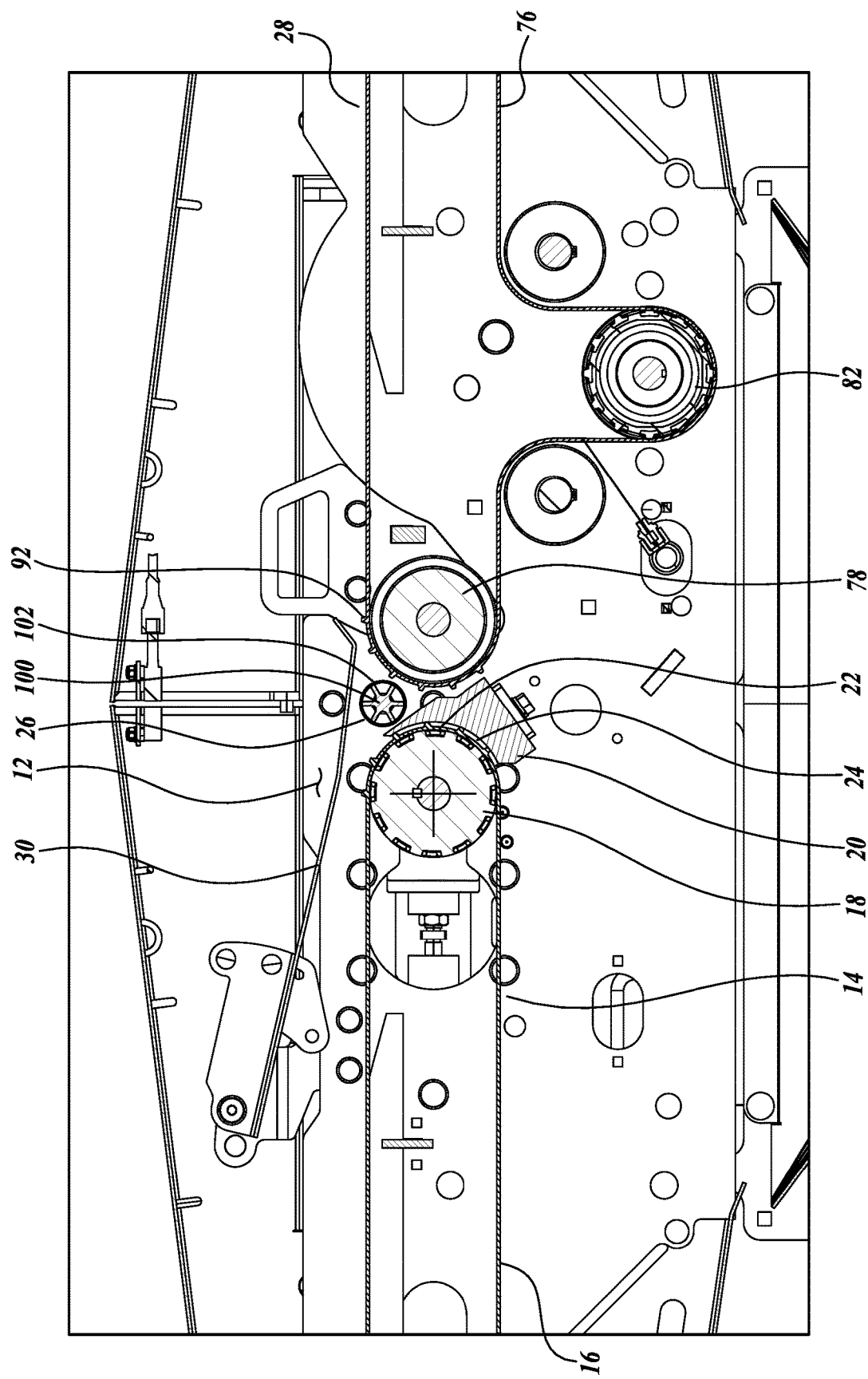
FIG. 3 is a large fragmentary view of FIG. 2 taken in cross-section.

Referring initially to FIGS. 1-3, an apparatus 10 for removing the skin of poultry pieces at a skinning station 12 is illustrated. The apparatus 10 includes a basic form, an infeed conveyor 14 for transporting or feeding poultry pieces to be skinned to the skinning station 12. The infeed conveyor 14 includes an endless belt 16 that is trained around an end roller 18 at the downstream end of the infeed conveyor, a pinch block 20 is configured with a concave pinch surface 22 having curvature closely following the curvature of the endless belt 16 trained around the end roller 18 to define a narrow gap 24 therebetween for capturing the skin of the poultry piece and forcing the skin through the gap 24, thereby pulling the skin away from the underlying flesh of the poultry piece.

A transfer roller 26 assists in transferring the skinned poultry piece to an outfeed conveyor 28. In addition, a hold down structure 30 is provided for applying downward pressure on the poultry piece as the poultry piece is carried by the infeed conveyor 14 towards the skinning station 12, while the poultry skin is being removed, and also while the skinned poultry piece is being transferred from the infeed conveyor 14 to the outfeed conveyor 28.

Next, describing apparatus 10 in greater detail, the apparatus includes a base structure 40 which supports the skinning station 12 at a desired elevation. The base structure 40 includes support legs 42 extending downwardly from a frame structure 44 on which the infeed conveyor 14, the outfeed conveyor 28, pinch block 20, transfer roller 26, and hold down structure 30 are all mounted. Casters 46 attached to the lower ends of the support legs 42 so that the apparatus 10 can be conveniently moved from place to place as needed. The casters 46 include a brake for preventing the castor wheels 48 from rotating, with the brake being engaged by pressing downwardly on brake lever 50.

Covers 51 are mounted on the frame structure 44 to cover most of the lengths of the infeed conveyor 14 and outfeed conveyor 28, including during operation of the apparatus 10. The covers are hinged at their ends so that they can be lifted upwardly at the middle of the apparatus at the location of the skinning station 12, thereby providing convenient access to the skinning station.

The base structure 40 also includes side plates 52 as well as end plate structures 54 to form a rigid construction. As shown in FIG. 3, a collection well in the form of a funnel 56 is located within the interior of the base structure to direct the skin removed from the poultry piece downwardly through an outlet opening 58 to, for example, a collection bin or take away conveyor, not shown. It is to be understood that the base structure 40 can be numerous other constructions.

As noted above, the infeed conveyor 14 is supported by frame structure 44 to transport poultry pieces to be skinned from an inlet end 70 to a downstream end 72, whereas the endless belt 16 of the conveyor wraps around the end roller 18 to travel along an arcuate path defined by the exterior of the end roller. The end roller 18 may be a drive roller or a driven roller. At the upstream end of the conveyor 14, the endless belt 16 wraps around an upstream end roller 74. It is to be understood that rather than utilizing in the infeed conveyor 14 with the endless belt 16, a different form of conveyance may be utilized for transporting the poultry pieces from the inlet end 70 to the skinning station 12. Poultry pieces to be skinned maybe delivered to the conveyor inlet end 70 by various methods, including manually, by transfer conveyor, by robot, etc.

As noted above, the frame structure 44 also supports outfeed conveyor 28 for carrying the skinned poultry pieces away from the skinning station 12. The outfeed conveyor 28 includes an endless belt 76 having its upstream end trained around an end roller 78 that is positioned in spaced relationship to the downstream end roller 18 of the infeed conveyor 14. The opposite downstream end of the endless belt 76 is trained around a downstream end roller 80 at the outlet end of the apparatus 10. As shown in FIG. 2, a drive roller 82 is located intermediate the end rollers 78 and 80. Idler rollers 84 and 86 wrap the lower run of the endless belt 76 around the drive roller 82.

Figure 4:
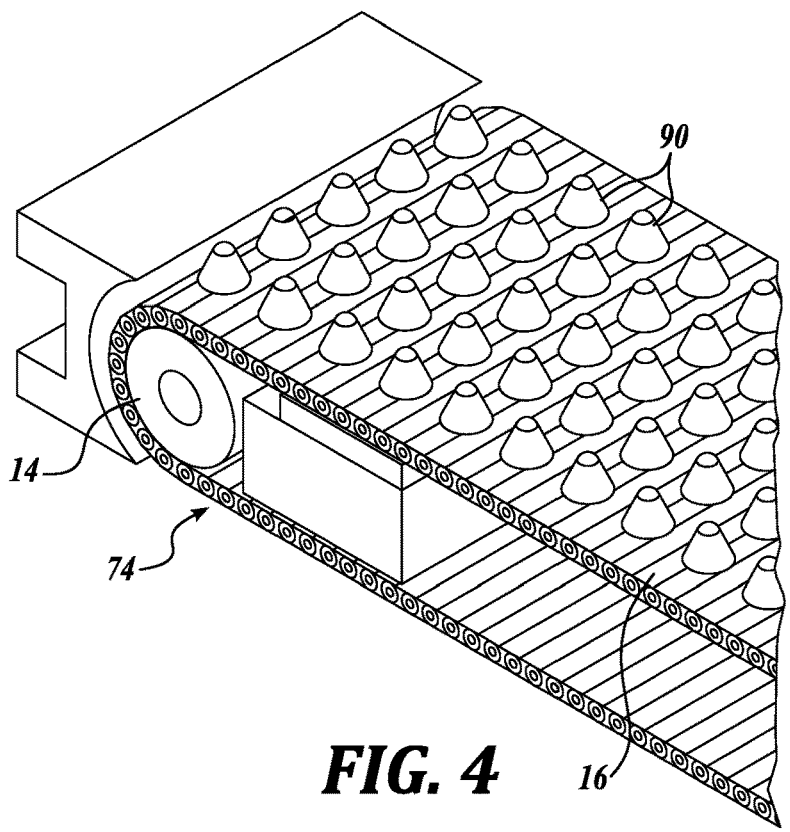
FIG. 4 is an enlarged fragmentary pictorial view of an endless belt shown in FIGS. 1-3.

The infeed conveyor belt 16 is textured or otherwise configured to enable the belt to grip the exterior of the skin of the poultry piece being transported on the belt, as well as while the skin is being pulled through the gap 24 between the belt and the pinch surface 22 of the pinch block 20. The texture on the belt may be in the form of protrusions 90 extending upwardly from the belt substrate. The protrusions can be various cross-sectional shapes, for instance circular, as shown in FIG. 4. The protrusions may taper in the direction outwardly from the belt substrate, and may have rounded tips. The protrusions can be of other shapes, such as square, rectangular, triangular, arcuate, elliptical, oval, etc. Also, the protrusions may be arranged in an orderly pattern about the surface of the conveyor belt, or maybe in a random pattern.

Figure 5:
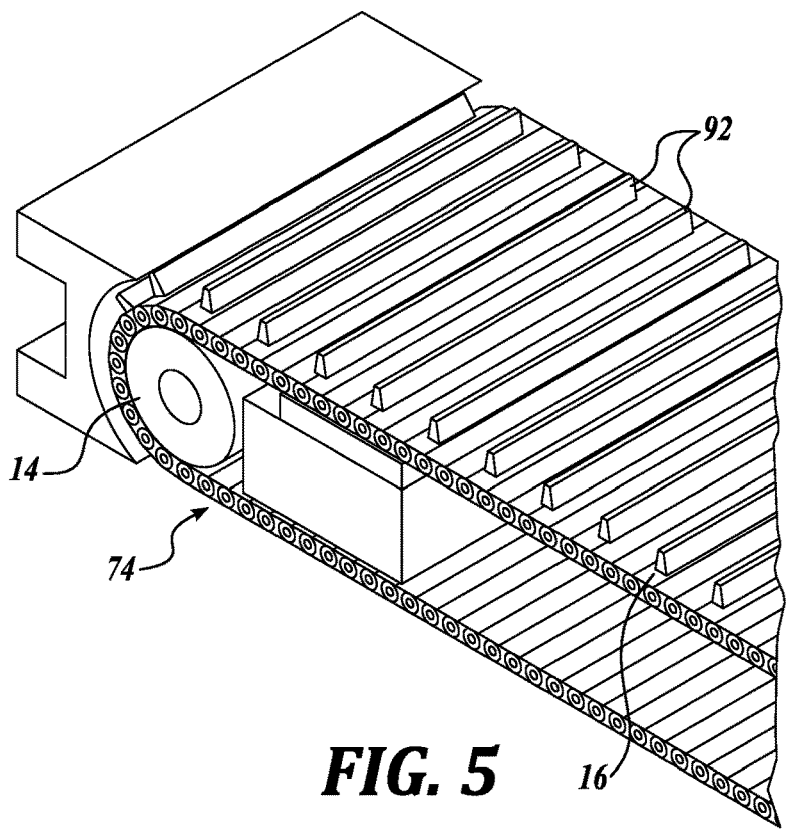
FIG. 5 is a view similar to FIG. 4, but with a different endless belt configuration.

As a further alternative, the protrusions may be in the form of ribs 92 that extend across the width of the conveyor belt 16, while spaced apart along the length of the belt, as shown in FIG. 5. In FIG. 5 the ribs 92 in cross-section are in the form of a truncated triangle. However, the ribs 92 can be of other configurations, including having parallel sides. Further, the upper edge of the ribs may be other than in a uniform elevation along the length of the ribs. For instance, the upper edge of the ribs may be undulating, have notches formed therein, or of other profiles.

As can be appreciated, the purpose of the protrusions or ribs is to grip the poultry piece to urge the poultry piece toward the pinch block, and also to urge the skinned portion of the poultry piece forwardly toward the outlet conveyor 22. To this end, the conveyor belt 16 may be textured otherwise than as described above. Moreover, the outfeed conveyor belt 76 may also be textured in a manner similarly to that of the infeed conveyor belt 16, or may be textured in a different manner, perhaps less aggressively than the infeed conveyor belt 16.

As discussed above, the skin being removed from the poultry piece is threaded into the narrow gap between the endless conveyor belt 16 as it trains around end roller 18 and the concave surface 22 of the pinch block 20. When viewing the end roller 18 and associated endless belt 16 in cross-section, shown in FIG. 3, the pinch block 20 extends along an arc of approximately 120° to 130° along the circumference of the end roller 18, beginning at about 45° in the clockwise direction from the vertical. At the beginning of the pinch block, the pinch block is relatively narrow and pointed so as to engage between the underside of the poultry piece skin and the flesh of the poultry piece, thereby to lead the skin into the gap 24 between the endless belt 16 and the pinch block surface 22.

As also discussed above, the apparatus 10 includes a transfer roller 26 positioned between the infeed conveyor 14 and the outfeed conveyor 28. The transfer roller facilitates the transfer of the poultry piece, with the skin removed, from the infeed conveyor 14 to be the outfeed conveyor 28. In this regard, the transfer roller 26 is positioned approximately midway between the downstream end roller 18 of the infeed conveyor 14 and the upstream roller 78 of the outfeed conveyor 28. In this location, the transfer roller 26 helps reduce the likelihood that the poultry piece will become stalled between the infeed conveyor 14 and the outfeed conveyor 28. The transfer roller 26 is powered to rotate so that the surface speed of the roller match the speed of the infeed conveyor 14 and/or the outfeed conveyor 28, so as not to damage the poultry piece being transferred from the infeed conveyor to the outfeed conveyor. Typically, the infeed conveyor 14 and outfeed conveyor operate at, or nearly at, the same speed.

To perform its function, the transfer roller 26 can be of various configurations. For example, as shown in FIGS. 2 and 3, the transfer roller 26 can be constructed in the form of a central shaft 100 and a plurality of ribs or paddles 102 that radiate outwardly from the central shaft 100 while extending along the length of the shaft. The paddles 102 are able to grip the underside of the skinned poultry piece and urged the poultry piece forwardly toward the outfeed conveyor 28. The overall size or diameter of the transfer roller 26 is selected so as to fit within the valley or gap formed by the end rollers 18 and 78 and still providing clearance from the pinch block 20. Also, the transfer roller at its upper circumference is approximately at the same elevation as the upper surface of the endless belts 16 and 76 of the conveyors 14 and 28. In this regard, the transfer roller may have a diameter of from about 1 to about 1.25 inches, but of course can be or a larger or smaller diameter The transfer roller 26 may be of other constructions than as shown in FIGS. 2 and 3. For example, the exterior of the transfer roller may include projections, ridges, flutes, teeth, knurling, or may be of other configurations rather than in the form of paddles 102 shown in FIGS. 2 and 3. Moreover, the size and density of the projections, ridges, flutes, teeth, knurling may depend on the type of poultry being processed as well as the size of the poultry pieces.

Next, referring to FIGS. 2, 3, 6, and 7, the hold down structure 30 is illustrated as being generally in the form of a substantially planar plate section 110 with integral inner mounting bracket sections 112 extending upwardly from side margins 114 at the upstream end of the plate section. The mounting bracket section 112 is securely attached to an intermediate bracket 116 and pivotally attached to an outer bracket 118 to mount the hold down structure 30 to the frame 44 so that the plate section 110 is positioned over the skinning station 12 and, in particular, above the end roller 18 of the infeed belt 16 and the transfer roller 26, see FIGS. 2 and 3.

To this end, the upstream end of the plate section 110 is pivotally mounted to the apparatus frame 44 by pivot pins 120 that extend through aligned holes formed in the inner mounting bracket sections 112 and the upright sections 122 of the outer brackets 118. The outer brackets 118 also include a horizontal intermediate section 124 spanning between the upright section 122 and a downwardly extending mounting flange 126, which is attached securely to the frame structure 44. To this end through holes 128 are formed in the mounting flanges 126 for receiving hardware members for attaching the outer bracket 118 to the frame structure 44.

Figure 6:
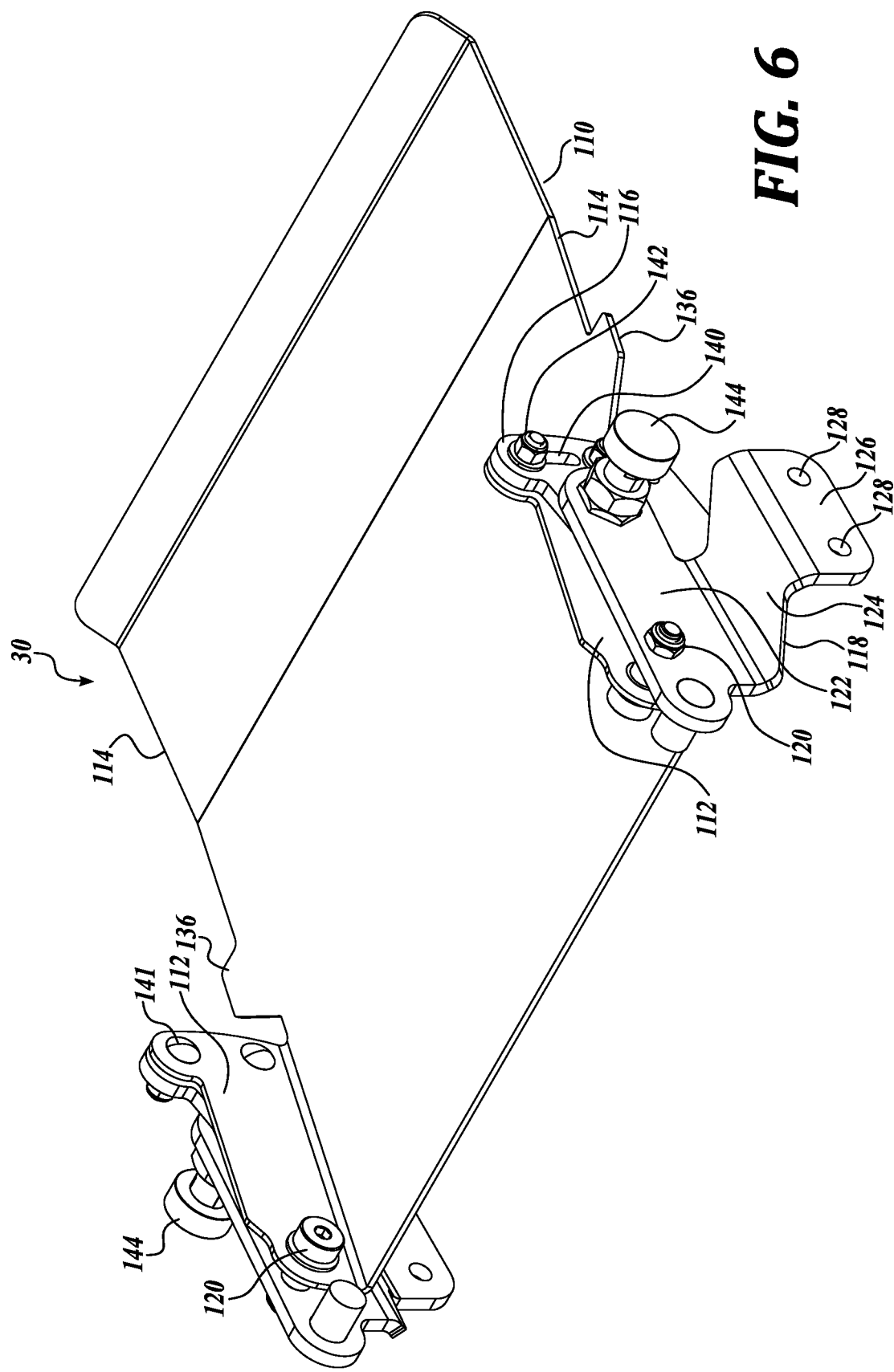
FIG. 6 is a pictorial view of the hold down plate in accordance with an embodiment of the present disclosure.
Figure 7:
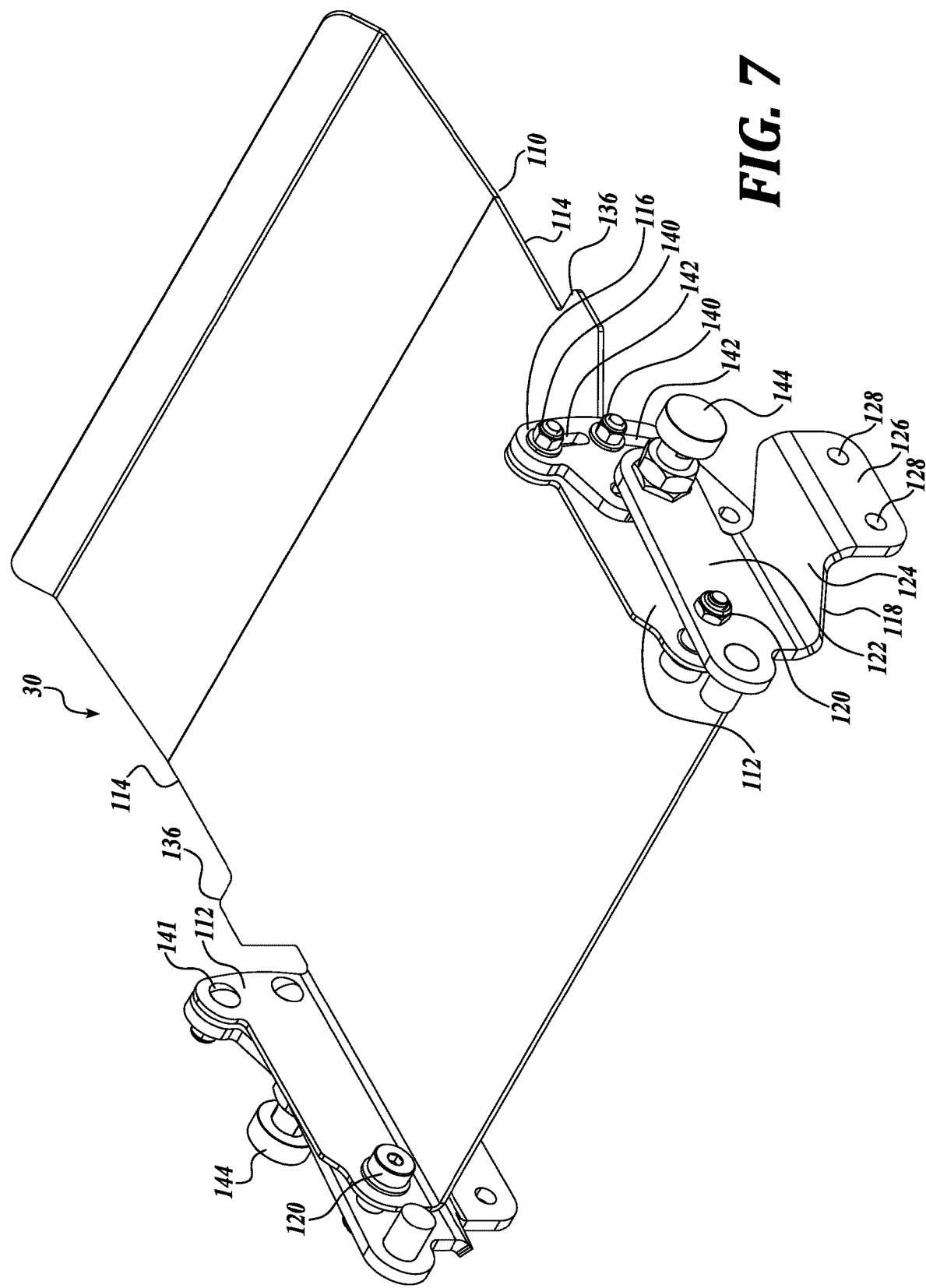
FIG. 7 is a view similar to FIG. 6 but with the hold down plate illustrated in upward position.
Figure 8:
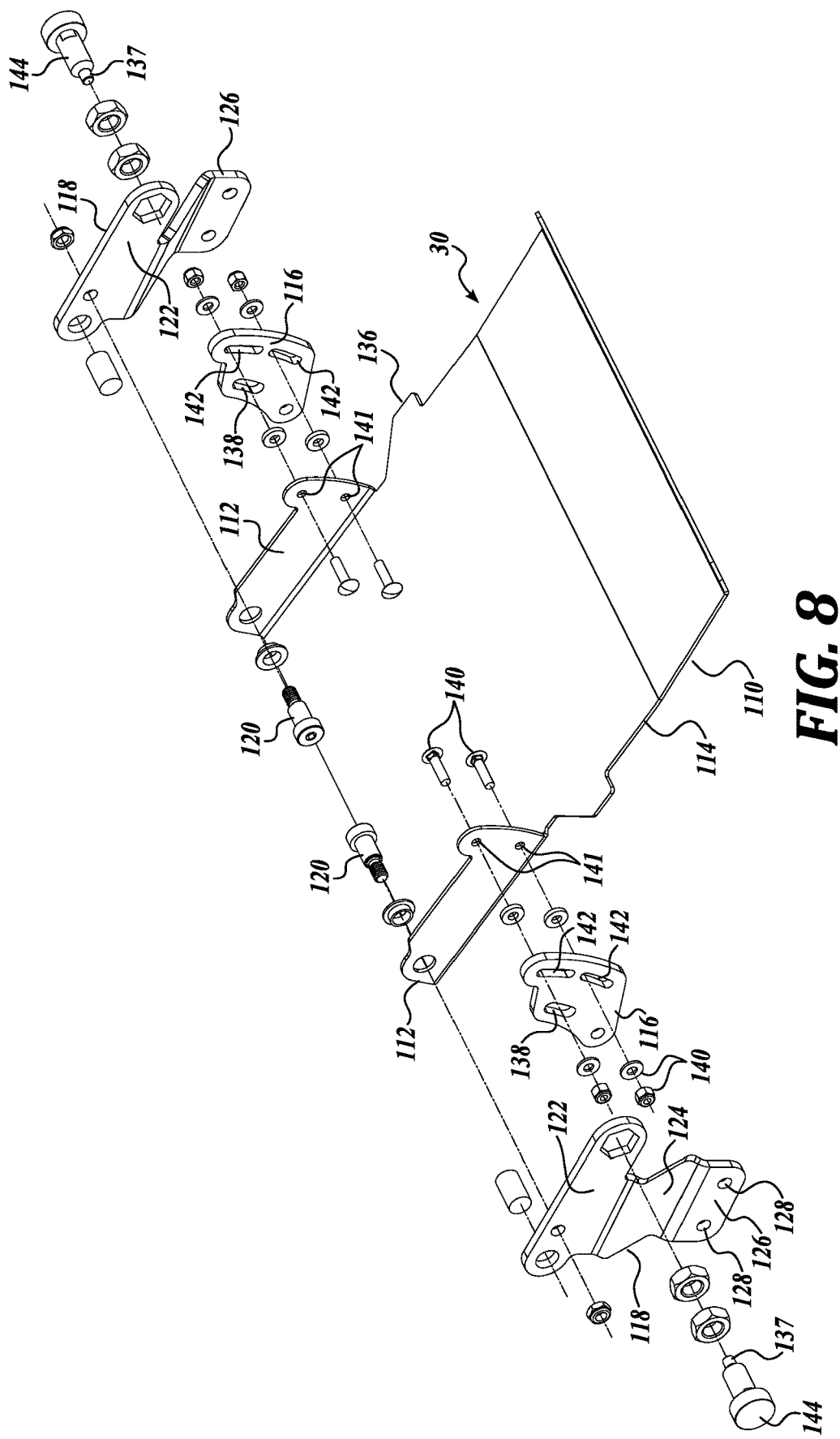
FIG. 8 is a pictorial exploded view of the hold down plate of FIGS. 6 and 7.

The plate section 110 is able to pivot about pivot pins 120 between a downward position shown in FIG. 6 to an upward position shown in FIG. 7. The maximum downward position of the plate section 110 is controlled by side tabs 136 extending outwardly from the adjacent side margin 114 of the plate section. The plate section 110 is able to pivot about pins 120 until the tabs 136 bear against portions of the frame structure 44. In this manner, it is assured that the plate section does not lower to the extent that the underside of the plate section strikes the inlet conveyor 14, transfer roller 26, or outlet conveyor 28, thereby causing damage to the hold down structure 30 or any of these components.

The upward pivot of the plate section 110 is also limited. In this regard, the inward ends 137 of pull pins 144 extend through arcuate slots 138 formed in the intermediate brackets 116. As the plate section 110 raises and lowers over the surface of a poultry piece, the inward ends 137 of the pull pins move along the length of the arcuate slots 138. The upward travel of the plate section 110 is limited when the inward ends 137 of the pull pins reaches the lower ends of the slots 138.

The nominal position of the plate section 110 spaced above the conveyor belt 16 can be adjusted. As such, poultry pieces of different thickness can be accommodated. For example, if the apparatus 10 is used to remove the skin from chicken breasts, the plate section may be nominally closer to the top surface of the conveyor belt that if the apparatus is used to remove the skin from larger turkey breasts. To this end, bolts 140 extend through a pair of vertically spaced apart holes 141 formed in the opposite ends of the mounting bracket sections 112 from the location of the pivot pins 120. The bolts 140 also extend through a pair of arcuate slots 142 formed in intermediate brackets 116. As can be appreciated, the nominal position of plate section 110 can be adjusted by changing the position of the bolts 140 along length of the arcuate slots 142.

As noted above, the spring-loaded release pins 144 are mounted on the outer bracket upright sections 122 to engage within aligned slots 138 formed in the intermediate brackets 116. When the release pins 144 are engaged with the slots 138, the upward pivoting movement of the plate section 110 is limited by the length of the slots 138 in the intermediate bracket 116. However, when the release pins 144 are pulled outwardly of the intermediate brackets 116, the plate section 110 together with the intermediate brackets 116 is free to rotate upwardly about pivot pins 120. In this manner, the plate section 110 can be rotated upwardly and away from the infeed conveyor 14 when access is desired to the skinning station 12, for example, when performing service on the apparatus 10 or cleaning the apparatus 10, which typically occurs at least after each production shift.

The downward force placed on the poultry pieces by the hold down structure 30 stems from the weight of the plate section 110 pivoting about the pivot pins 120. As a nonlimiting example, the plate section 110 may apply a downward load on the poultry piece in the range of from about 2 pounds to about 6 pounds. It will be appreciated that this load is substantially independent of the thickness of the poultry piece. As such, a substantially constant load is applied to the poultry pieces even if the thickness of the poultry pieces varies. The plate section 110 is free to pivot about pins 120.

It will also be appreciated that such downward load on the poultry pieces facilitates that the skin of the poultry piece will be properly engaged in the gap 24 between the endless belt 16 and the concave surface 22 of the pinch block 20.

Further, the hold down structure 30, by applying a downward force on the poultry piece, helps ensure that the poultry piece is engaged by the transfer roller 26 and then by the outfeed conveyor 28. In the past, other means have been required to serve the purpose of the hold down structure 30. For example, an overhead conveyor has been used to put downward pressure against the upper surface of the poultry pieces. As can be appreciated, the amount of pressure applied to the upper surface of the poultry pieces by the overhead conveyor would depend on the thickness of the poultry pieces, with such pressure quite variable. However, as described above, the hold down structure 30 of the present disclosure has the ability to apply a substantially constant downward force on the poultry pieces regardless of the thicknesses of the poultry pieces. Moreover, the hold down structure 30 is much simpler and much less costly than utilizing a powered overhead conveyor to perform the same function.

The underside of the plate section 110 may be polished, coated, or otherwise processed to present a smooth surface against the poultry pieces being processed so that, although applying a downward pressure on the poultry pieces, the poultry pieces are not inhibited from moving forward with the endless belt 16 even though the hold down plate 110 is pressed against the upper side of the poultry piece. If the hold down plate 110 is constructed from a metallic material, such as stainless steel, the finish or smoothness of the underside of the hold down plate is desirably of at least a number 4 finish (1.5 to 0.9 micrometers).

Although the plate section 110 is illustrated as being of substantially planar form or configuration in the direction lengthwise of the infeed and outfeed conveyors, the plate section can be formed so that segments of the plate section extend relatively upwardly in the downstream direction of the plate section, so as to compensate for the pivot axis of the plate section to be positioned above the top surface of the poultry pieces being processed. Also, the free or distal end of the plate section is turned upwardly so as not to present the end edge of the plate section against the poultry pieces being processed, thereby reducing the likelihood of damage to the poultry pieces.

While illustrative embodiments have been illustrated and described, it will be appreciated that various changes can be made therein without departing from the spirit and scope of the invention. For example, in place of a solid plate 110, the hold down structure can be composed of a series of parallel rods that are formed to resemble the cross-sectional shape of the plate 110 when viewing the plate in the lateral direction relative to the lengths of the conveyors 14 and 28. The upstream ends of the rods can be pivotally mounted to an axle extending across the infeed conveyor 16 so that each of the rods is able to pivot independent of the other rods. In this manner, a substantially uniform load is applied across the width of the poultry piece traveling along the infeed conveyor. Such rods can apply downward pressure by virtue of their own weight, or can be biased downwardly, for example, through the use of a spring or other elastic means.

The embodiments of the invention in which an exclusive property or privilege is claimed are defined as follows:

1. A poultry product skinning apparatus, comprising:
    (a) an infeed conveyor for transporting poultry pieces toward a skinning station, the infeed conveyor having a textured endless conveyor belt for gripping the skin of the poultry piece, the infeed conveyor having a downstream end at the skinning station where the conveyor belt travels along an arcuate path;
    (b) a powered outfeed conveyor for transporting skinned poultry pieces away from the skinning station;
    (c) a pinch block at the skinning station, the pinch block having an arcuate surface in close proximity to the arcuate path of the infeed conveyor belt to define an opening sized to engage the outer skin of the poultry piece between the infeed conveyor belt and the arcuate surface of the pinch block to pull the skin from the poultry piece;
    (d) a powered transfer roller positioned between the downstream end of the infeed conveyor and the upstream end of the outfeed conveyor to support and facilitate transfer of the skinned poultry piece from the infeed conveyor to the out feed conveyor; and (e) a hold down structure spaced above the skinning station, the hold down structure mounted to apply downward pressure to the poultry piece while at the skinning station.

2. The poultry product skinning apparatus of claim 1, wherein the transfer roller is configured to grip the underside of the skinned poultry piece.

3. The poultry product skinning apparatus of claim 2, wherein the exterior configuration of the transfer roller is selected from one of the group of: projections, ribs, ridges, flutes, teeth, and knurling.

4. The poultry product skinning apparatus of claim 1, wherein the transfer roller extends laterally to the lengths of the infeed conveyor and outfeed conveyor.

5. The poultry product skinning apparatus of claim 4, wherein the transfer roller is positioned so that the upper surface of the transfer roller is at an elevation corresponding to the top surface of the infeed conveyor.

6. The poultry product skinning apparatus of claim 4, wherein the transfer roller is positioned so that the upper surface of the transfer roller corresponds to the elevation of the top surface of the outfeed conveyor.

7. The poultry product skinning apparatus of claim 1, wherein the speed of the outer circumference of the transfer roller corresponds to the speed of at least one of the infeed conveyor and the outfeed conveyor.

8. The poultry product skinning apparatus of claim 1, wherein the downstream end of the infeed conveyor is defined by an end roller around which the infeed conveyor belt is trained; and the diameter of the transfer roller is from $\frac{1}{6}$th to $\frac{1}{3}$rd of the diameter of the end roller of the infeed conveyor.

9. The poultry product skinning apparatus of claim 1, wherein the hold down structure extends across the infeed belt.

10. The poultry product skinning apparatus of claim 9, further comprising at least one of a first stop to limit the downward travel of the downstream end portion of the hold down structure and a second stop to limit the upward travel of the downstream end portion of the hold down structure.

11. The poultry product skinning apparatus of claim 10, wherein the rods have an upstream end that is pivotally mounted to enable each rod to pivot in independently of each other.

12. The poultry product skinning apparatus of claim 9, wherein the hold down structure comprises a plate extending across substantially the width of the infeed conveyor, the downstream section of the plate extending downstream along the infeed conveyor to at least the location of the transfer roller.

13. The poultry product skinning apparatus of claim 9, wherein the plate defining an underside facing the infeed conveyor, the underside of the plate being polished to a finish of at least 1.5 to 0.9 micrometers.

14. The poultry product skinning apparatus of claim 13, wherein the shape of the protrusions is selected from the group including circular, square, rectangular, triangular, arcuate, elliptical, and oval.

15. The poultry product skinning apparatus of claim 13, wherein the protrusions comprise ribs extending across the width of the input conveyor belt.

16. The poultry product skinning apparatus of claim 9, wherein the hold down structure comprises a plurality of rods extending long the length of the infeed conveyor and spaced across the width of the infeed conveyor.

17. The poultry product skinning apparatus of claim 1, wherein the hold down structure is spaced above the infeed belt and the transfer roller.

18. The poultry product skinning apparatus of claim 1, wherein the hold down structure applies a downward load on the poultry pieces of about 2 to 6 pounds.

19. The poultry product skinning apparatus of claim 1:
wherein the hold down structure comprising an upstream end section and a downstream end section; and
further comprising a pivot mounting structure to pivotally mount the upstream end of the hold down structure to allow the downstream end section of the for the hold down structure to press against the poultry piece being skinned.

20. The poultry product skinning apparatus of claim 1, wherein the texture of the input conveyor belt comprises protrusions extending from the conveyor belt.

* * * * *

UNITED STATES PATENT AND TRADEMARK OFFICE
CERTIFICATE OF CORRECTION

PATENT NO. : 11,807,472 B2  
APPLICATION NO. : 17/099084  
DATED : November 7, 2023  
INVENTOR(S) : G. Gasbarro Page 1 of 1

It is certified that error appears in the above-identified patent and that said Letters Patent is hereby corrected as shown below:

In the Claims

| Column | Line | |
|---|---|---|
| 9 | 3 | Claim 1 change "out feed" to -- outfeed -- |
| 10 | 3 | Claim 11 change "in independently" to -- independently -- |
| 10 | 24 | Claim 16 change "long the" to -- along the -- |
| 10 | 37 | Claim 19 change "section of the for" to -- section for -- |

Signed and Sealed this  
Twentieth Day of May, 2025

Coke Morgan Stewart  
*Acting Director of the United States Patent and Trademark Office*